June 10, 1941.　　J. M. HARGRAVE　　2,245,089
WELDER'S CLAMP
Filed Oct. 25, 1939
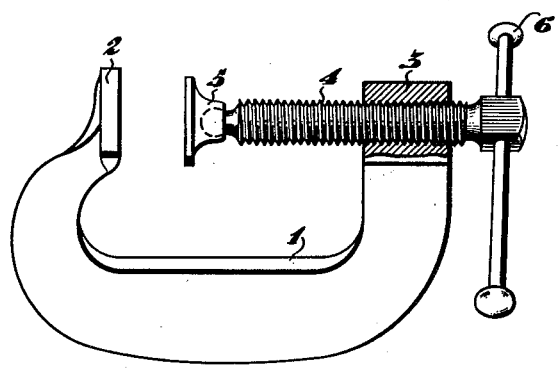
INVENTOR.
BY John M. Hargrave
Wood & Wood ATTORNEYS Patented June 10, 1941

2,245,089

UNITED STATES PATENT OFFICE 2,245,089

WELDER'S CLAMP

John M. Hargrave, Cincinnati, Ohio

Application October 25, 1939, Serial No. 301,260

4 Claims. (Cl. 113—99)

This invention relates to an improved type of clamp to be used in the art of welding. More specifically, it relates to an improved and simplified clamp to be used in supporting one or more articles, or sections of articles, having ferrous surfaces in a welding operation in which a ferrous welder's rod is used to supply metal to the joint.

In the past, it has been conventional to use an ordinary all steel or cast iron clamp for this purpose, as a simple welding operation is an operation that does not justify the use of expensive or complicated equipment. The ordinary all steel or cast iron clamp included a steel or steel equivalent screw which served to tighten the clamp and to draw and hold together, during the welding operation, the sections being welded. Since the clamp was necessarily adjacent the welding point or line, great difficulty was experienced in preventing the molten metal from splattering on the screw threads of the clamp and hardening there. Any appreciable amount of splattering would naturally destroy the utility of the screw and, resultantly, the clamp itself.

The solution of this problem has heretofore been considered to the positioning of a protective guard on the clamp in such a way that the small drops of molten metal resulting from the welding operation would contact the surface of the guard rather than the screw threads. Guards of this type are necessarily somewhat bulky and tend to make the clamp rather unwieldy. In addition, the guard and its attachment to the clamp adds rather materially to the cost of an article, which for commercial purposes must be an inherently simple structure. A minor mechanical problem has always been attendant to the attachment of the guard to the clamp, and this point of attachment was usually the weakest point in a structure otherwise adapted and intended for rough usage.

The conception of the present invention is that of forming the entire screw portion of the clamp, or at least the threaded sections thereof, from a non-ferrous metal such as silicon manganese bronze brass or the like, to which splattered drops of molten ferrous metal will not readily adhere or fuse. In the preferred structure of the invention, it is possible to dispense entirely with the bulky guard and thereby provide a structure of materially increased simplicity which is equally useful for the purpose intended, and which is materially easier to handle and less likely to be damaged by rough handling.

The object of my invention, therefore, has been to provide an improved and simplified welder's clamp, the utility of which will not be destroyed because of splattered metal adhering to the threads of the screw section of the clamp during the welding operation, even though this section be unguarded.

Further objects and advantages will be readily apparent from the ensuing description of the drawing, in which:

The single view in the drawing is a side elevation of a C-clamp showing a preferred embodiment of the invention.

The C-clamp, indicated generally at 1, has an abutment head 2 and a nut or threaded heel portion 3. A screw 4 traverses the threaded heel and cooperates with a ball and socket tip 5 and a sliding pin handle 6 to clamp the metal between the head and the tip.

The screw 4 is turned from a non-ferrous metal such as brass, which has no cohesive or adhesive affinity for a molten ferrous metal.

In the welding operation, such as in clamping together two sheets of steel to be bonded by a lap joint weld, the screw section 4 is necessarily very close to the actual weld point or line. The metal supplied to the joint by a welder's rod is in a molten state, and if it splatters as is usually the case, the small drops of molten metal coming in contact with a surface for which they have an affinity, will fuse or adhere thereon as protuberances. Upon cooling, these protuberances prevent the threading of the screw.

In the clamp disclosed in the preferred embodiment of the invention, the screw threads being formed from brass or other like non-ferrous metal, have no affinity for the splattered ferrous metal and will either not adhere to it at all, or can be very quickly and conveniently removed should they adhere slightly.

It is not an essential feature of the invention that the tip of the screw portion, indicated at 5 in the drawing, be formed from silicon manganese bronze or a like non-ferrous metal, although this is entirely permissible. The utility of this tip is not greatly affected by the splattering of molten metal upon it, since it is not absolutely essential that the tip have a perfectly smooth outer surface. The ball and socket joint is protected from splattering by the tip itself.

In place of the bronze and brass non-ferrous metals disclosed heretofore, other non-ferrous metals such as copper, aluminum and various alloys may be used for forming the threaded portion of the screw of the clamp. In addition, the screws of the clamps may be formed of ferrous metals presenting non-ferrous metallic surfaces which may be provided thereon by plating or coating so that the exposed surface of the screw resists adhesion with particles of splatter from the welding operation.

It will be understood, of course, that the non-ferrous metal selected for providing a screw of a clamp in accordance with the present invention, should not have a melting point so low that hot particles of splatter from a welding operation, coming into contact with the non-ferrous metal, tend to form craters in it due to localized melting.

While the non-ferrous metals, in general, are somewhat more expensive than steel or cast iron screws employed heretofore, the amount of non-ferrous metal used in the manufacture of the screw is not so great as to appreciably increase the total cost of the clamp.

Having fully described my invention, I desire to be limited only by the ensuing claims:

1. A welder's clamp comprising a frame having two spaced arms projecting therefrom, an abutment associated with one such arm, a screw threaded through an aperture in the opposed arm and having an end tip adapted to engage the abutment upon the forward end of the screw, said screw having a major portion of its screw threads normally exposed to molten metal particles incident to the welding operation, the body portion of the screw having an outer surface formed from a metal of a class which does not have an affinity for molten iron such as, for example, brass.

2. A welder's clamp comprising a bent frame having two spaced arms projecting therefrom, the extremity of one arm being configurated to form an abutment, a screw threaded through an aperture in the other arm and having a major portion of its screw threads exposed to molten metal particles incident to the welding operation, said screw having a tip at one extremity thereof adapted to engage the abutment and maintain metal objects in position for welding, said screw having a main body portion entirely formed of brass, whereby the molten metal particles incident to the welding operation will not adhere to its surface.

3. A clamp for use in welding, comprising a pair of jaws, means for mounting said jaws in clamping relationship, one of said jaws being movable, and a screw for moving said jaw engaged through the mounting means, said screw having a major portion of its screw threads normally exposed to molten particles incident to the welding operation, said screw being formed of a metal of a class which does not have an affinity for molten iron such as for example, brass.

4. A clamp for use in welding, comprising a pair of jaws, means for mounting said jaws in clamping relationship, one of said jaws being movable, and a screw for moving said jaw engaged through the supporting means, said screw being formed of silicon manganese bronze and having a major portion of its threads exposed to molten metal particles when the clamp is positioned for welding.

JOHN M. HARGRAVE.